United States Patent [19]
Markin et al.

[11] Patent Number: 5,510,984
[45] Date of Patent: Apr. 23, 1996

[54] AUTOMATED GUIDED VEHICLE ENUNCIATOR SYSTEM

[75] Inventors: Rodney S. Markin; Gary W. Kipp, both of Omaha, Nebr.

[73] Assignee: Board of Regents-Univ. of Nebraska, Lincoln, Nebr.

[21] Appl. No.: 345,078

[22] Filed: Nov. 28, 1994

[51] Int. Cl.⁶ .................................................. G06F 15/50
[52] U.S. Cl. ................... 364/424.02; 364/461; 364/478; 318/587; 180/168
[58] Field of Search ............................. 364/424.02, 461, 364/468, 478; 348/118, 119; 318/568.12, 587; 180/167, 168, 169

[56] References Cited

U.S. PATENT DOCUMENTS

| | | | |
|---|---|---|---|
| 3,933,099 | 1/1976 | Sieb | 104/88 |
| 4,119,900 | 10/1978 | Kremnitz | 318/587 |
| 4,530,056 | 7/1985 | MacKinnon et al. | 364/424.02 |
| 4,593,238 | 6/1986 | Yamamoto | 318/587 |
| 4,672,280 | 6/1987 | Honjo | 318/587 |
| 4,817,000 | 3/1989 | Eberhardt | 364/443 |
| 4,837,704 | 6/1989 | Lengefeld | 364/478 |
| 4,918,607 | 4/1990 | Wible | 364/424.02 |
| 4,939,651 | 7/1990 | Onishi | 364/424.02 |
| 4,982,329 | 1/1991 | Tabata et al. | 364/424.02 |
| 4,996,468 | 2/1991 | Field et al. | 318/587 |
| 5,006,996 | 4/1991 | Nakamura et al. | 364/478 |
| 5,091,855 | 2/1992 | Umehara et al. | 364/424.02 |
| 5,111,401 | 5/1992 | Everett, Jr. et al. | 364/424.02 |
| 5,122,957 | 6/1992 | Hattori | 364/424.02 |
| 5,163,001 | 11/1992 | Luke, Jr. | 364/424.02 |
| 5,170,352 | 12/1992 | McTamaney et al. | 364/424.02 |
| 5,190,428 | 3/1993 | Bryant et al. | 364/478 |
| 5,202,832 | 4/1993 | Lisy | 364/424.02 |
| 5,214,588 | 5/1993 | Kaneko et al. | 364/478 |
| 5,276,618 | 1/1994 | Everett, Jr. | 364/424.02 |
| 5,280,431 | 1/1994 | Summerville et al. | 364/424.02 |
| 5,281,901 | 1/1994 | Yardley et al. | 364/424.02 |
| 5,307,273 | 4/1994 | Oh et al. | 364/424.02 |
| 5,367,456 | 11/1994 | Summerville et al. | 364/424.02 |

*Primary Examiner*—Kevin J. Teska
*Assistant Examiner*—Tyrone V. Walker
*Attorney, Agent, or Firm*—Zarley, McKee, Thomte, Voorhees & Sease; Mark D. Frederiksen

[57] ABSTRACT

The enunciator system for an AGV includes a transmitter mounted on the AGV connected to an electrical control circuit having a plurality of individual switches operable to cause the transmitter to transmit a specific signal upon arrival of the AGV at predetermined locations along a circuitous route. Each location along the AGV route has identifier markings detectable by the AGV such that the AGV will stop for a predetermined period of time at each location as it travels along its route. If a switch for a specific location is actuated, the transmitter will transmit a signal to a receiver at that location which then triggers an audio or visual alarm at the location to alert a person at the location as to the arrival of an item on the AGV. After a predetermined period of time, the alarm will cease and the AGV will continue along its circuitous route. If the item is not removed from the AGV at the specified location, the AGV will continue along with the route until it arrives once again at the specified location at which time it will again trigger the alarm at that location, Because each specific location has its own independent receiver to receive an independent signal from the transmitter, more than one location may be specified for different items without triggering the alarms of undesignated locations.

12 Claims, 4 Drawing Sheets

5,510,984

1

AUTOMATED GUIDED VEHICLE ENUNCIATOR SYSTEM

TECHNICAL FIELD

The present invention relates generally to automated guided vehicles (AGVs), and more particularly to an enunciator system which is triggered by movement of the AGV to predetermined locations to alert a laboratory or location that a specimen is awaiting processing on the AGV.

BACKGROUND OF THE INVENTION

Automated guided vehicles are widely used for conveying articles in production lines, warehouses, and among various laboratories in hospitals and clinics. Such AGVs are typically computer controlled to deliver materials between designated locations, and are equipped with drive wheels and steering mechanism to guide the vehicle along a predetermined path.

While there are many types of control systems for AGVs, which permit the vehicle to travel a fixed route while transporting specimens or materials from one designated location to other designated locations. One navigation method utilizes a wire embedded in the ground which emits a radio frequency signal on which the vehicles can be moved between designated locations. Other AGVs will follow a designated path painted or applied to the floor.

One particular area in which AGVs have become quite useful is in the transport of clinical specimens among various laboratories at a hospital or research institution. However, one of the problems which arises in the clinical laboratory setting is the lack of a system to alert workers within a laboratory that a specimen is present on the AGV for testing and/or analysis. Thus, the vehicle is either forced to remain at the laboratory location until such time as a laboratory worker sees the vehicle, or the vehicle must continue with the fixed route until completed. Any specimens which were not retrieved from the vehicle would then be stored at the end of the route or returned to the initial location.

SUMMARY OF THE INVENTION

It is therefore a general object of the present invention to provide an AGV with an enunciator system which will alert persons within a clinical laboratory section that a specimen is waiting for retrieval on the vehicle.

Another object of the present invention is to provide an AGV enunciator system which will provide a visual and/or audio alarm for a predetermined period of time to alert persons in a designated area of the arrival of a specimen.

Still another object is to provide a method for transporting materials among a plurality of locations which directs an automated guided vehicle through a predetermined route and stops the vehicle at designated locations, continuously until the designated materials are received at specified locations.

These and other objects will be apparent to those skilled in the art.

The enunciator system for an AGV includes a transmitter mounted on the AGV connected to an electrical control circuit having a plurality of individual switches operable to cause the transmitter to transmit a specific signal upon arrival of the AGV at predetermined locations along a circuitous route. Each location along the AGV route has identifier markings detectable by the AGV such that the AGV will stop for a predetermined period of time at each

2 location as it travels along its route. If a switch for a specific location is actuated, the transmitter will transmit a signal to a receiver at that location which then triggers an audio or visual alarm at the location to alert a person at the location as to the arrival of an item on the AGV. After a predetermined period of time, the alarm will cease and the AGV will continue along its circuitous route. If the item is not removed from the AGV at the specified location, the AGV will continue along with the route until it arrives once again at the specified location at which time it will again trigger the alarm at that location. Because each specific location has its own independent receiver to receive an independent signal from the transmitter, more than one location may be specified for different items without triggering the alarms of undesignated locations.

DESCRIPTION OF THE PREFERRED EMBODIMENT

Figure 1:
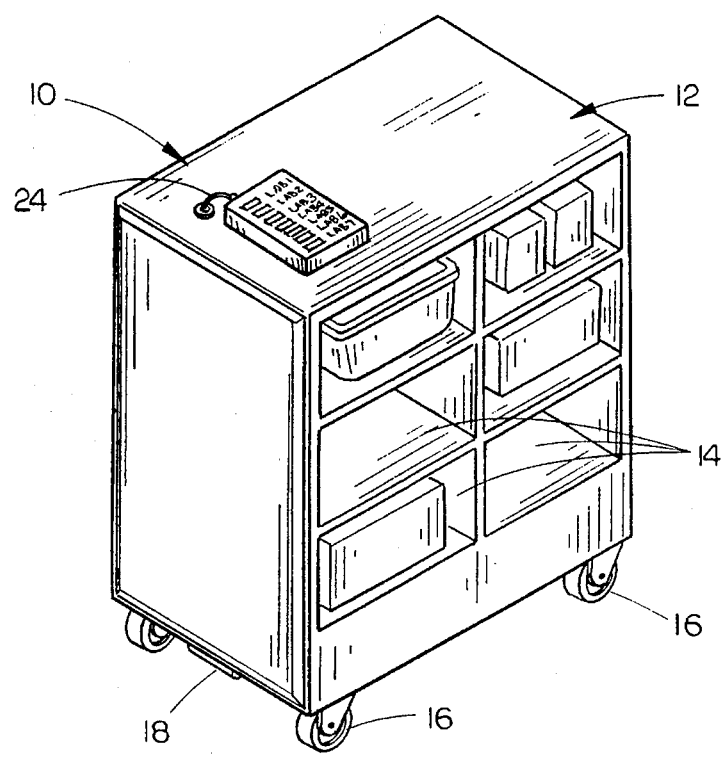
FIG. 1 is a perspective view of an automated guided vehicle with the enunciator system of the present invention.

Referring now to the drawings, in which similar or corresponding parts are identified with the same reference numeral, and more particularly to FIG. 1, the enunciator system of the present invention includes a transmitter portion designated generally at 10, electrically connected to an automated guided vehicle 12.

AGV 12 may be any of a wide variety of various vehicles capable of traveling a circuitous route, but the enunciator system of the present invention was designed and incorporated in the AGV manufactured by Bell & Howell, the "Sprint" model. AGV 12 includes a plurality of compartments 14 for receiving documents, specimens, or other materials to be transported about a building. AGV 12 includes a plurality of driven wheels 16, some of which are steerable, in order to direct the AGV over a predetermined route. A sensor 18 is mounted on the forward lower end of AGV 12 and will detect a guide path affixed to a floor surface which directs the AGV along a route, designated generally by arrows R in FIG. 2.

Figure 2:
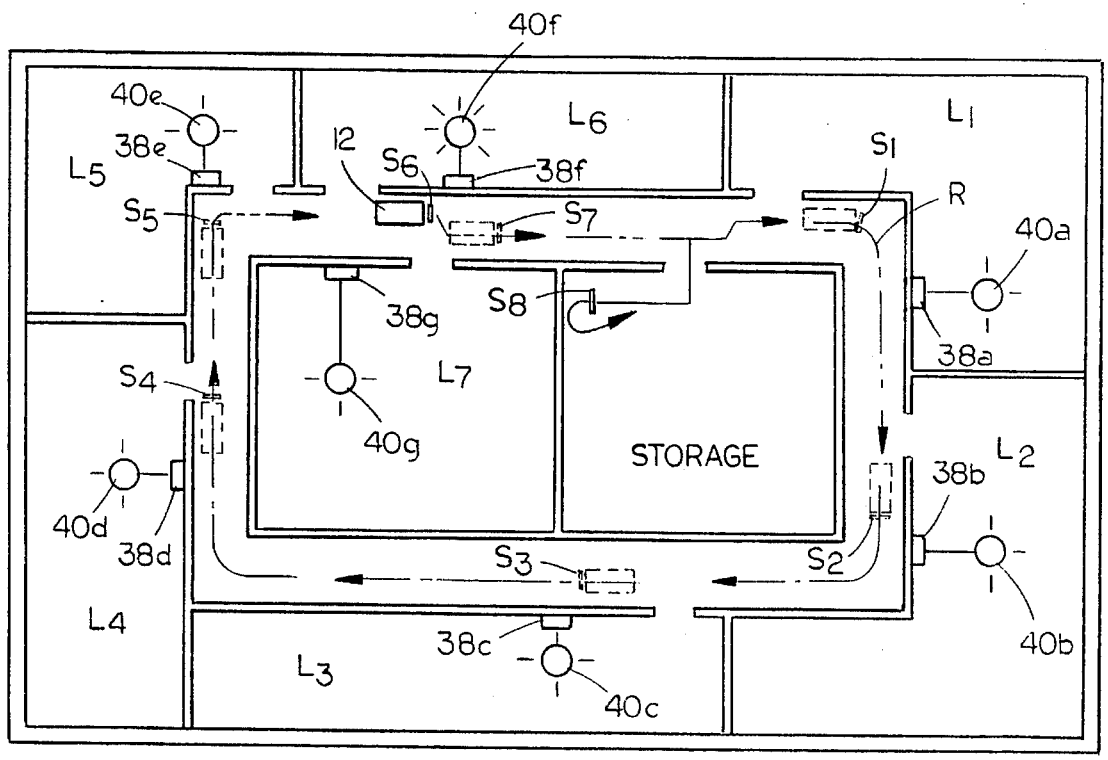
FIG. 2 is a schematic plan view of a building showing the circuitous route of the AGV and the alert mechanism in each designated location along the route.
Figure 3:
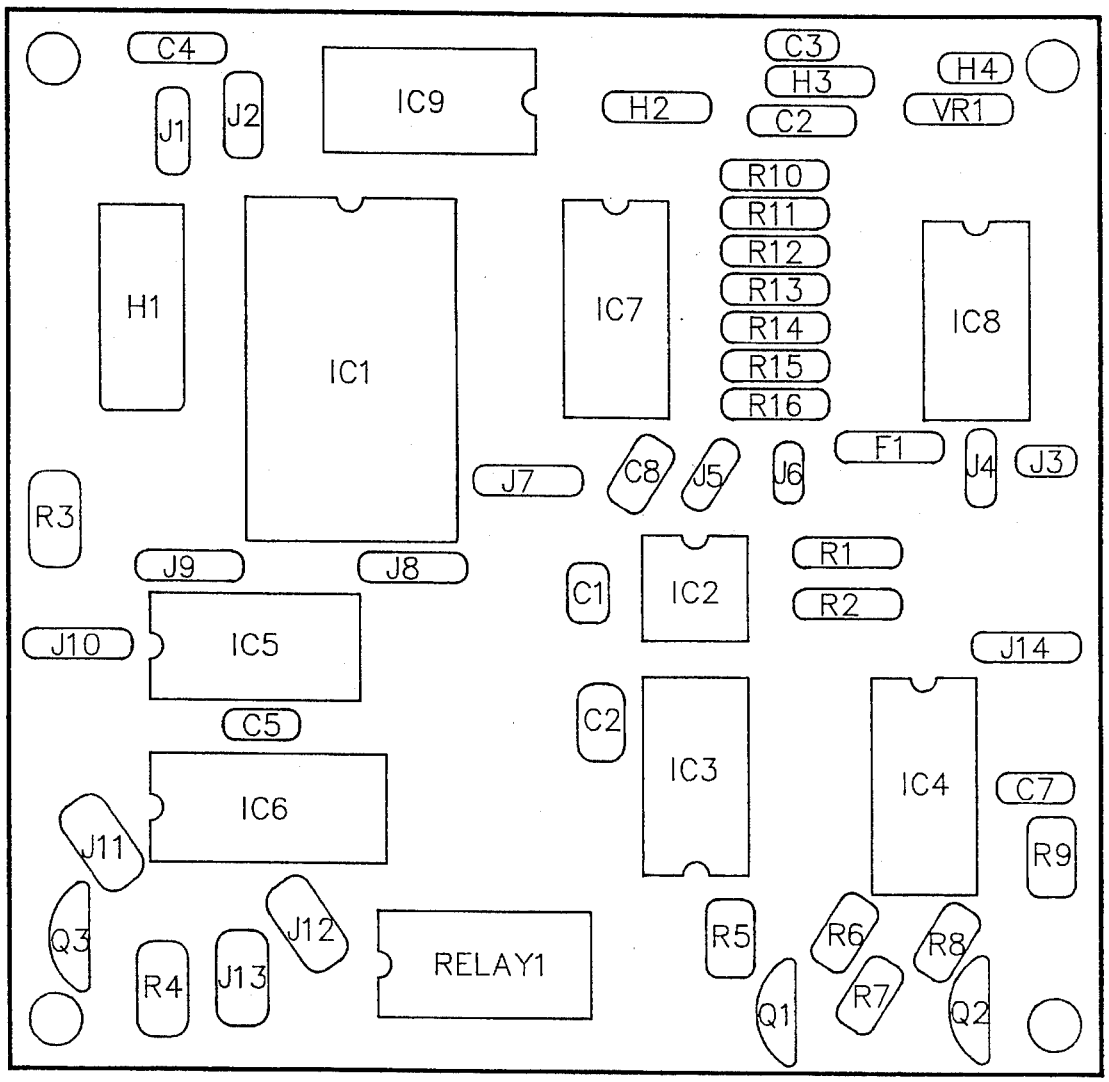
FIG. 3 is a circuit board diagram of a transmitter utilized as part of the enunciator system.

As soon in FIG. 1, transmitter portion 10 includes a housing 20 with a transmitter 22 (see FIG. 3) therein. An electrical cable 24 is electrically connected to sensor 18 such that a "stop" location detected by sensor 18 will cause transmitter 10 to transmit a signal related to that particular "stop". In FIG. 2, stop locations are designated generally at S1–S8 along route R, for each lab L1–L7. Stop location S8 within the storage room serves as a central storage location for the AGV when the vehicle is not in use.

Referring once again to FIG. 1, housing 20 includes a plurality of switches 24–36 each corresponding with one of labs L1–L7. Each switch 24–36 includes an "on" and an "off" position and serves to trigger transmitter 22 when AGV 12 reaches the associated stop S1–S7 for the switch 24–36.

Referring now to FIG. 2, each lab L1–L7 includes a receiver 38 for receiving a signal from transmitter 10. Receivers 38 are set to receive a predetermined signal from transmitter 10 in response to the activation of switches 24–36. Thus, receiver 38a in lab 1 is triggered by the receipt of a signal from transmitter 10 responsive to switch 24. Similarly, receiver 38b is responsive to a signal caused by a switch 26, etc. Because receivers 38a–38g are set to receive distinctive signals, individual receivers cannot be triggered by a transmission of a signal to any other receiver.

Figure 4:
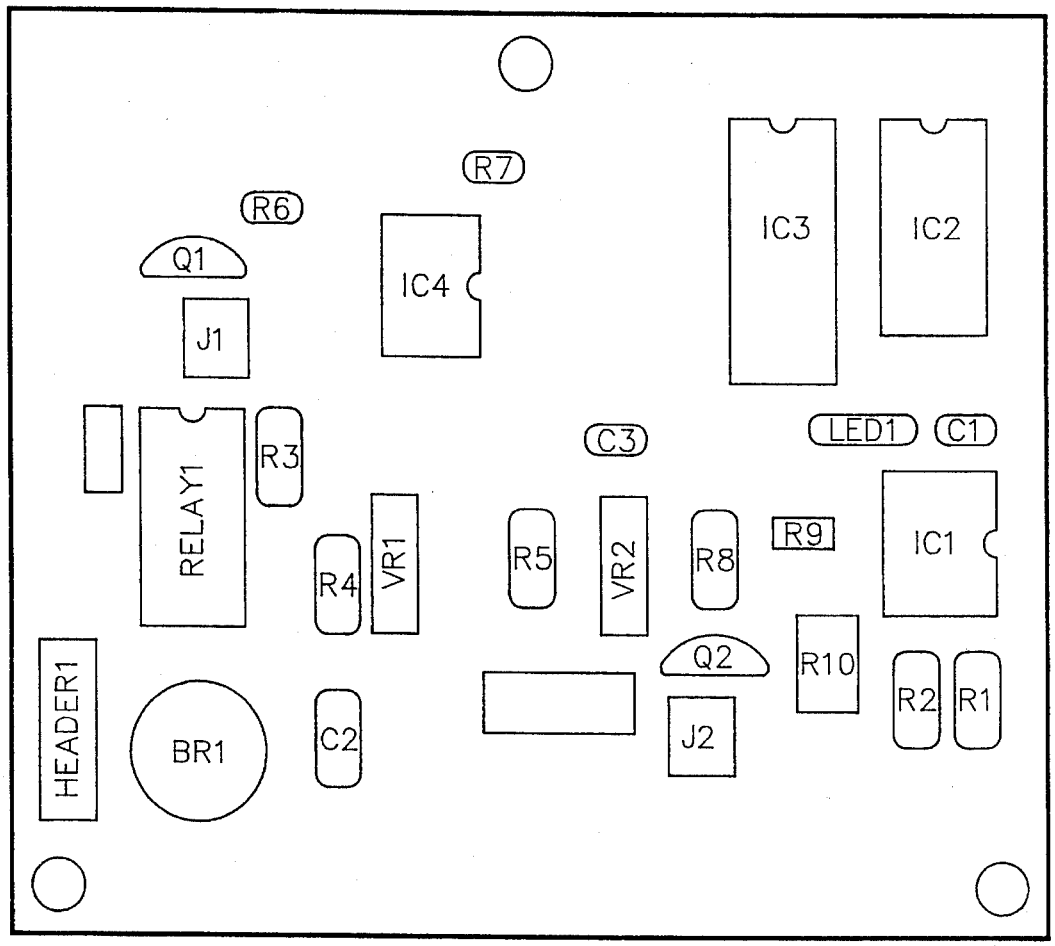
FIG. 4 is a circuit board diagram of a receiver located in each designated location and utilized as pad of the enunciator system.
Figure 5:
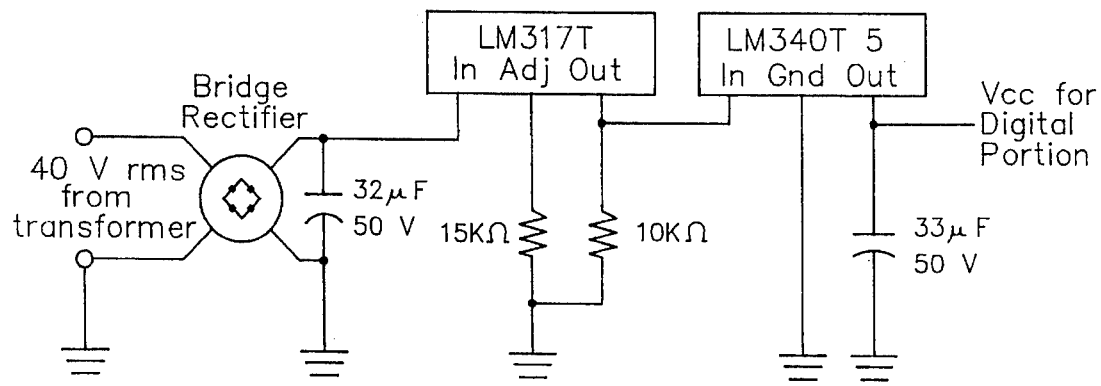
FIG. 5 is a schematic diagram of the analog portion of the receiver circuit.
Figure 6:
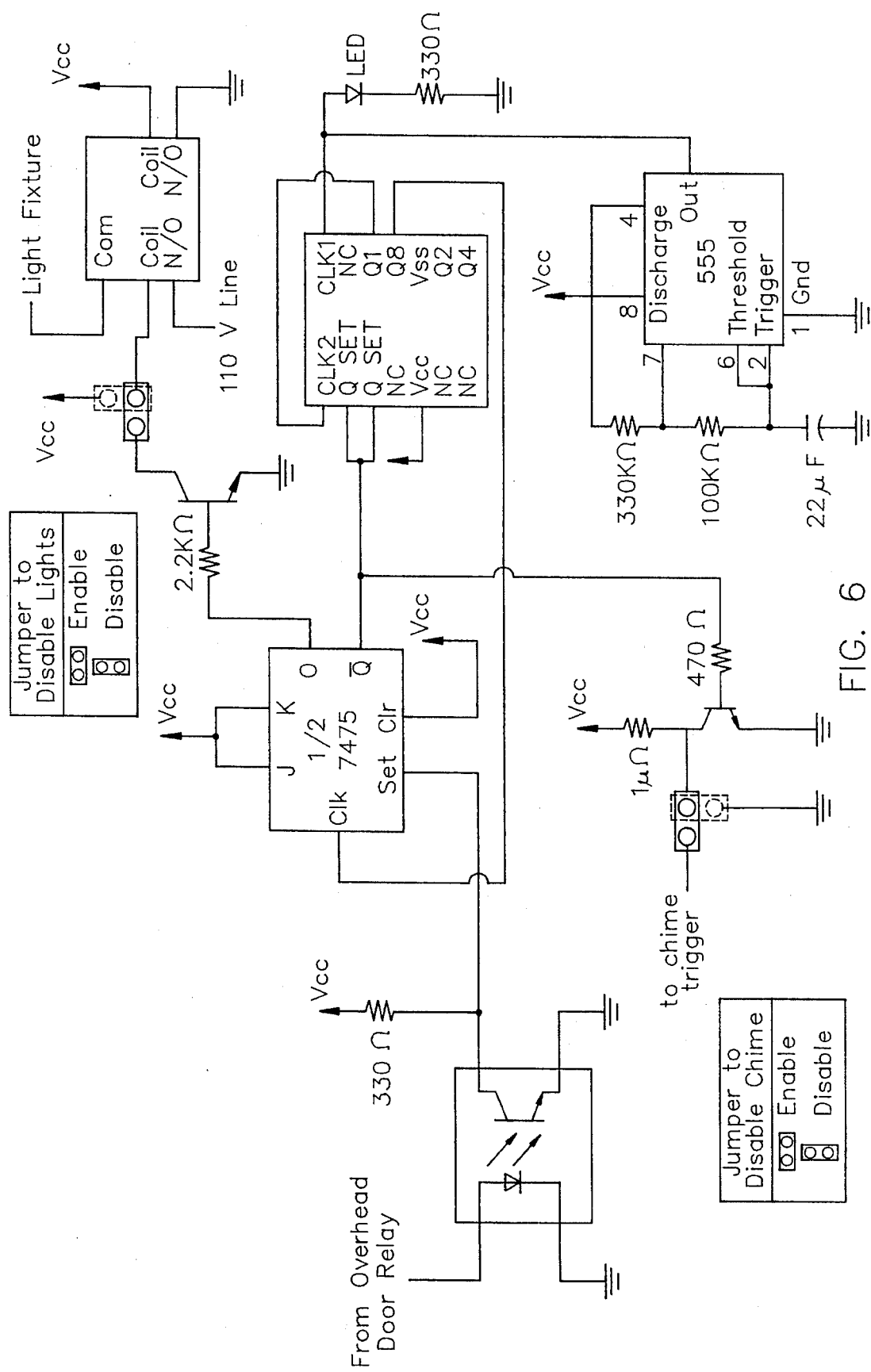
FIG. 6 is a schematic diagram of the digital section of the receiver circuit.

FIGS. 4–6 show schematic diagrams for one type of receiver which will trigger an audio and visual alarm within a lab. As shown on FIG. 2, AGV 12 has arrived at stop S6 and activated receiver 38F so as to activate alarm 40f. Each alarm 40a–40g is electrically connected to its associated receiver 38a–38g and preferably includes both an audio and visual alert mechanism, such as a flashing light and buzzer or chime.

In operation, AGV 12 is programmed to follow a closed loop route R either continuously, or at selected times. Conventionally, AGV 12 will stop at each stop location S1–S7, and will either continue another round after stop S7 or go to storage at stop S8.

When it is desired to transport a specimen or other material to a specific laboratory, the technician merely inserts specimen in one of the compartments 14 on AGV 12, and then selects and activates the appropriate switch 24–36 for the desired and location for the specimen. For example, a technician in laboratory L 1 may desire to have a specific test conducted on the specimen at laboratory L4. The technician may either take the specimen to the AGV 12 in the storage area at stop S8, or await the normal circuit of the AGV 12 along its route until it stops at stop S1. The technician then places the specimen in a compartment 14 and activates switch 30, corresponding with laboratory L4. As the AGV continues along route R, it will stop at stops S2 and S3 before arriving at stop S4. Upon sensor 18 detecting stop S4, a signal is transmitted along cable 24 which checks to see whether switch 30 has been activated. Since switch 30 has been activated in this example, the transmitter 22 (FIG. 3) is triggered to send a radio frequency (RF) signal to receiver 38d. Receiver 38d receives the RF signal and activates the light and/or chime alarm 40d in laboratory L4 is alert any technicians within lab L4 that a specimen awaits retrieval at stop S4. The alarm 40d remains active for a predetermined period of time, typically approximately one minute, before deactivating. If a technician is present, the specimen is removed from AGV 12, and the technician deactivates switch 30. Thus, in further circuits along route R, the alarm 40d will not be triggered unless another technician adds a specimen and again activates switch 30.

On the other hand, if no technologist is available to receive the specimen from the AGV at lab L4, switch 30 would remain activated and the AGV would continue with its circuit, stopping at stops S5, S6 and S7 to complete its route. At the end of the route, after stop S7, the AGV will continue another circuit of route R, once again stopping at stop S4 and triggering alarm 40d. The AGV will continue making the circuit and triggering alarm 40d until switch 30 is deactivated.

While various types of transmitters and receivers may be utilized with the present invention, the preferred embodiment of the transmitter and receiver utilize the following components:

| Transmitter Parts | | Receiver Parts | |
|---|---|---|---|
| Component | Part/Value | Component | Part/Value |
| IC1 | 74150N | IC1 | LM555 |
| IC2 | 555 Timer | IC2 | 74LS93 |
| IC3 | 74LS93 | IC3 | 74LS76 |
| IC4 | 7476N | IC4 | 4N33 |
| IC5 | 74LS93 | RELAY1 | Omron G2E-184P-M-US |
| IC6 | 74LS153 | BR1 | W01G |
| IC7 | 7447 | Q1 | 2N4401 |
| IC8 | 7 Segment LED | Q2 | 2N4401 |
| IC9 | 74LS08 | R1 | 330K |
| RELAY1 | W171DIP7 5V | R2 | 100K |
| VR1 | LM340T12 | R3 | 10K |
| VR2 | LM340T5 | R4 | 15K |
| Q1–Q3 | 2N4401 | R5 | 1K |
| R1 | 10k | R6 | 2.2K |
| R2 | 4.7K | R7 | 330 |
| R3 | 680 | R8 | 1K |
| R4 | 1K | R9 | 330 |
| R5 | 330 | R10 | 470 |
| R6 | 1K | C1 | 2.2 µF |
| R7 | 680 | C2 | 33 µF |
| R8 | 1K | C3 | 33 µF |
| R9 | 68K | | |
| R10–R16 | 330 | | |
| C1 | 4.7 µF | | |
| C2 | 33 µF | | |
| C3–C7 | 0.1 µF | | |
| H1 | 2 × 5 | | |
| H2 | 1 × 4 | | |
| H3 | 1 × 3 | | |
| H4 | 1 × 2 | | |
| F1 | 1 A pico fuse | | |
| J1–JI4 | 0 Ohm Jumpers | | |

Whereas the invention has been shown and described in connection with the preferred embodiment thereof, it should be understood that many modifications, substitutions and additions may be made which are within the intended broad scope of the appended claims.

We claim:

1. An enunciator system for an automated guided vehicle (AGV) traveling a circuitous route through a building having a plurality of designated locations, the AGV being of the type having an electrical control system for guiding and driving the vehicle along the route, and each designated location having individual identifier markings detectable by the AGV control system for recognizing and distinguishing each of said plurality of designated locations to the control system, comprising:

a transmitter mounted on said AGV, with means for transmitting a first signal to a remote receiver;

a first receiver mounted at a first of said plurality of designated locations, detecting the first signal from the transmitter and activating an alarm in response thereto;

first alarm means mounted at said first location connected to said first receiver, for alerting a person at the first location of the detection of the first signal;

an electrical control circuit connected to said AGV control system, including means for activating the transmitter to transmit the first signal upon detection of the identifier markings for said first location by the AGV control system; and a first switch connected to said control circuit and operable between an "on" position, permitting said means for activating the transmitter to transmit the first signal, and an "off" position, preventing said means for activating the transmitter from transmitting the first signal;

said first receiver means for detecting the first signal and actuating the first alarm means including means for continuously activating the first alarm for a predetermined period of time;

said electrical control circuit including means for preventing the continued travel of the AGV for a period of time equal to the predetermined period of time for which the first alarm is continuously activated.

2. The enunciator system of claim 1, wherein said alarm means includes an audio alarm.

3. The enunciator system of claim 1, wherein said alarm means includes a visual alarm.

4. The enunciator system of claim 1, wherein said alarm means includes both an audio and visual alarm.

5. The enunciator system of claim 1, further comprising:

said transmitter including means for transmitting a second signal to a remote receiver;

a second receiver mounted at a second of said plurality of designated locations, for detecting the second signal from the transmitter and activating a second alarm in response thereto;

second alarm means mounted at said second location connected to said second receiver, for alerting a person at the second location of the detection of the second signal;

said electronic control circuit including means for activating the transmitter to transmit the second signal upon detection of the identifier markings for said second location by the AGV control system;

a second switch connected to said control circuit and operable between an "on" position permitting said means for activating the transmitter to transmit the second signal, and an "off" position, preventing said means from activating the transmitter from transmitting the second signal.

6. A method for enunciating the arrival of an item at a predetermined location, the item being carried by an automated guided vehicle (AGV) through a predetermined circuitous route, comprising the steps of:

placing an item to be transported on the AGV;

selecting a location to which the item is to be transported on an electronic control unit connected to a control system of the AGV;

activating the AGV to follow a predetermined circuitous route;

said AGV stopping at each of a plurality of predetermined locations along said route;

said electronic control unit transmitting a first signal to a first receiver at the selected first location once the AGV stops at the first location;

said first receiver activating an alarm at the first location in response to the first signal; the step of activating an alarm at the first location including the step of continuously activating the alarm for a predetermined period of time and further comprising the step of the AGV continuing on the predetermined route once the predetermined period of time has elapsed.

7. The method of claim 6, wherein the step of activating an alarm includes the step of illuminating a light.

8. The method of claim 6, wherein the step of activating an alarm includes the step of sounding an audio alarm.

9. The method of claim 6, wherein the step of activating an alarm includes the step of activating both audio and visual alarms.

10. The method of claim 6, further comprising the steps of:

said electronic control unit transmitting the first signal to the first receiver upon arrival of the AGV at the first location upon a second trip around the AGV circuitous route.

11. The method of claim 10, further comprising the step of continuing the steps of continuing on the predetermined route and said control unit transmitting the first signal to the first receiver upon each arrival of the AGV at the first location.

12. The method of claim 11, further comprising the steps of:

removing the item from the AGV at the first location; and deselecting the first location on the electronic control unit such that said first signal is not transmitted to the first receiver upon subsequent arrivals of the AGV at the first location.

\* \* \* \* \*